H. M. BROWN.
TIRE MAKING MACHINE.
APPLICATION FILED FEB. 20, 1919.
1,438,156. Patented Dec. 5, 1922.
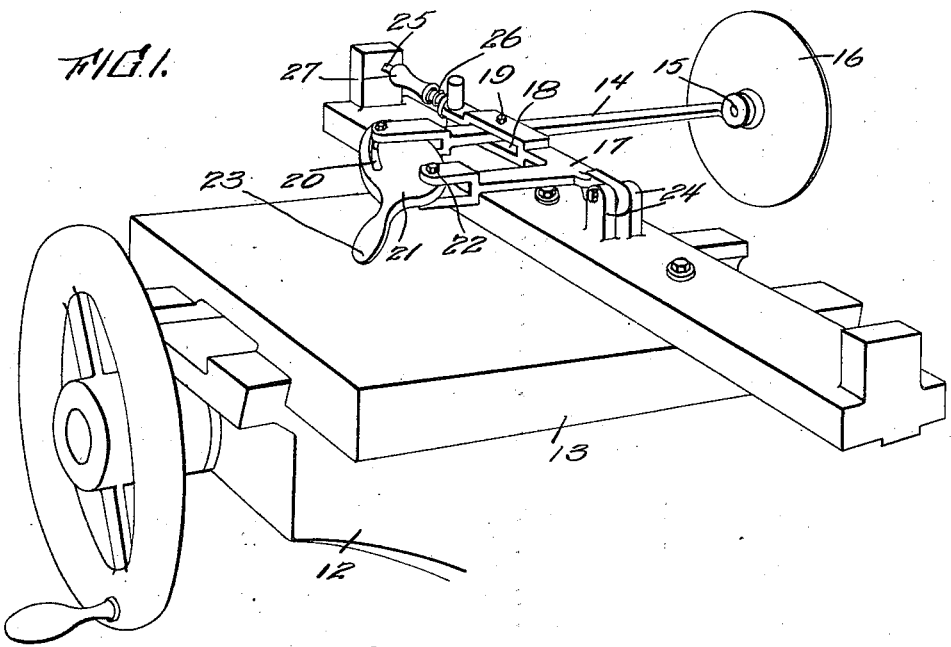
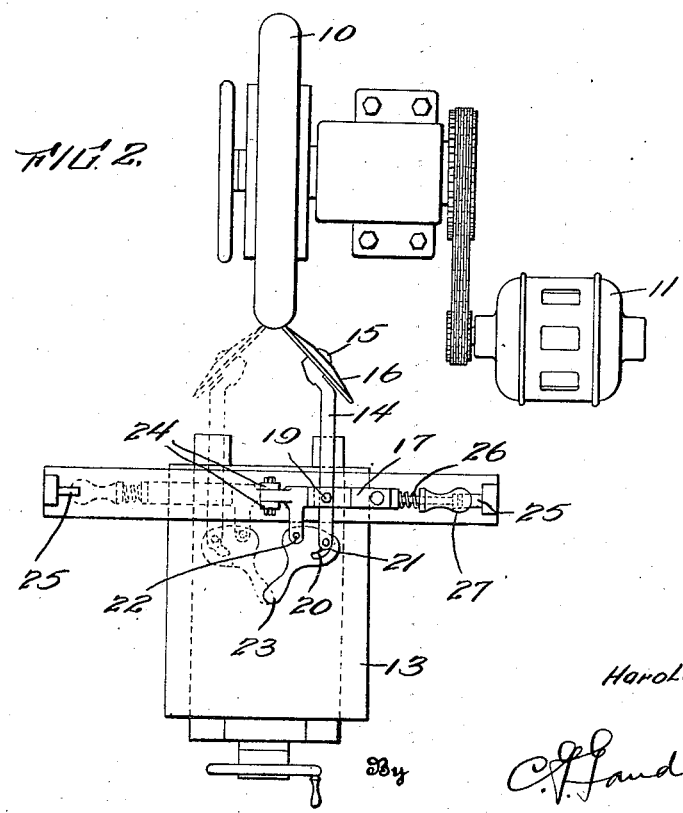
Inventor
Harold M. Brown
By
his Attorney.

Patented Dec. 5, 1922.

1,438,156

UNITED STATES PATENT OFFICE.

HAROLD M. BROWN, OF AKRON, OHIO, ASSIGNOR TO THE GOODYEAR TIRE & RUBBER COMPANY, OF AKRON, OHIO, A CORPORATION OF OHIO.

TIRE-MAKING MACHINE.

Application filed February 20, 1919. Serial No. 278,200.

*To all whom it may concern:*

Be it known that I, HAROLD M. BROWN, a citizen of the United States, and resident of Akron, Ohio, have invented new and useful Improvements in Tire-Making Machines, of which the following is a specification.

My present invention relates to an improvement in tire making machines and has particular reference to an improved mechanism for making cord tire carcasses of the pneumatic type.

The many important objects and advantages of my improved device will be readily apparent from a perusal of the accompanying drawings, specification and claims wherein there is illustrated and described one of the many practical embodiments of my device.

In the drawings, throughout the several views of which similar reference numerals designate corresponding parts:

Figure 1 is a perspective view of the stitcher mounting; and

Figure 2 is a top plan view of the same, showing in full lines the position assumed for shaping on one side of the core and in dotted lines the alternate position.

The type of tire machine conventionally illustrated in the drawings is one of many practical assemblies, which embody the essential elements, a driven core and a stitcher mounting, to which my improved fabric shaping mechanism may be adapted.

Referring to the drawings, the numeral 10 designates a revoluble core, driven through a suitable connection by a motor 11, the driving mechanism being so arranged as to permit reversing the direction of rotation of the core at will, as, for example, by reversal of the electric motor 11.

The fabric shaping mechanism, in this instance, comprises a base or pedestal 12, upon which is slidably mounted, for reciprocation towards and away from the core, a carriage 13. Upon the forward end of the carriage is a shaping-disc-supporting arm 14, to one end of which is revolubly secured by an axle 15, a fabric shaping disc 16.

The arm 14 is pivotally connected, at its approximate center, to a transverse arm 17, by being projected through a slot 18 carried therein and receiving a pivot pin 19. The rear end of the arm 14 connects to an eccentric slot 20 cut in a substantially circular cam 21, which is in turn pivoted to the arm 17, as at 22. The cam 21 is manually controlled by a handle 23 provided thereon. A pair of bearing bosses 24, cast or otherwise secured to the carriage 13 along the center line thereof, form a suitable bearing for one end of the transverse arm 17, the other end of which is held in spring pressed relation with a boss or lug 25 carried by the carriage. This spring pressed relation is obtained through the medium of a spring 26, carried in a hollow handle 27, which bears against a reduced end portion of the arm 17.

*Operation.*

To begin the operation of shaping a ply of fabric down upon the core, assuming, of course, that a ply has been previously laid upon the core, the operator will place the core in rotation, swing the shaping disc arm to the correct side of the core to conform the 45° angle lay of the threads as is desired, then slowly feed the carriage forward and hold the shaping disc in contact with the core by grasping the handle on the cam. Upon completion of the operation, the core will be stopped, the carriage returned, the shaping disc arm swung to the opposite side and the operation then repeated. The direction of rotation of the core in the second operation is reversed to still favor the angular lay of the thread.

What I claim is:

1. A tire building machine including a revoluble core, a driving mechanism for rotating the core, means whereby the direction of rotation may be reversed at will, a carriage slidable toward and away from the core, a fabric shaping element for laying a ply of fabric down upon the core, a cam for controlling the movement of the fabric shaping element against the core, and a mounting supported on the said carriage for the fabric shaping element and cam whereby they may be swung vertically through an angle of substantially 180° for operation on either side of the core at will.

2. A tire-building machine including a revoluble core, a carriage having a to-and-fro movement in relation to the core, and means for shaping fabric-plies on the core comprising a fabric-shaping element, a supporting instrumentality therefor, a mounting for the instrumentality turning on an approximately horizontal axis whereby the instrumentality and element may be swung from a position at one side of a line extending through the medial line of the periphery of the core to a position at the opposite side thereof, and a cam-member pivoted on the mounting and connected to the instrumentality for swinging it on an axis perpendicular to that of the mounting.

3. A tire-building machine including a revoluble core, a carriage having a to-and-fro movement in respect to the core, and means for shaping fabric-plies on the core comprising a fabric-forming element, a supporting-arm normally swinging on approximately a vertical axis to vary the relation of the forming-element to the core, an arm-controlling cam-member pivoted on the mounting and connected to the arm for moving it on its vertical axis, and a mounting for the arm swinging on approximately a horizontal axis whereby the position of the arm, its controlling cam, and its forming-element may be reversed in relation to the respective sides of the core.

4. A tire-building machine including a revoluble core, reversible driving-mechanism therefor, a carriage having a to-and-fro movement in relation to the core, means for actuating the carriage, and fabric-forming mechanism mounted on the carriage and positionable thereby in respect to the core and comprising an element-sustaining arm, a forming-element rotatable on the extremity of the arm, a mounting for the arm, a horizontal axis to position the arm and its forming element alternately at opposite sides of the center line of the tread of the core, the arm being swingably mounted on the mounting on an axis normal to said horizontal axis, and a cam-element pivoted on the mounting and having an arcuate slot with which one end of the arm co-acts for effecting its swinging movement.

5. A tire building machine including a revoluble core, driving mechanism for rotating the core in either direction, a reciprocable carriage, an arm pivotally mounted on the carriage in the plane of the core and swingable about its pivot through the plane of the core to lateral positions on each side thereof, latching means on the carriage adapted to secure the arm in each of its lateral positions, a second arm pivotally mounted on the first arm on an axis normal to the pivotal axis of the first arm, a fabric shaping element carried by the second arm, and means for manually advancing the shaping element to operative relation with the core.

6. A tire building machine including a revoluble core, driving means for rotating the core, a reciprocable carriage movable substantially radially relative to the core, an arm having one end pivoted to the carriage and adapted to swing about an axis substantially radial relative to the core, a fabric shaping element, a second arm operatively carrying the shaping element and pivoted to the first named arm on an axis substantially normal to the pivotal axis of the first-named arm, and means for manually controlling the operation of the shaping element relative to the core.

7. A tire building machine including a revoluble core, driving means for rotating the core, a reciprocable carriage, and a mounting for fabric forming mechanism comprising an arm pivotally attached to the carriage and swingable in a plane normal to the direction of movement of the carriage, latching means for securing the arm in its extreme lateral positions relative to the carriage, a second arm pivotally mounted on the first-named arm, a stitching element mounted on one end of the second arm, a manually operated cam device mounted on the first named arm and cooperating with the remaining end of the second arm to actuate the stitching element.

In witness whereof, I have hereunto signed my name in the presence of two subscribing witnesses.

HAROLD M. BROWN.

Witnesses:
L. M. HARTMAN,
B. J. McDANEL.